US011289071B2

(12) United States Patent
Maeda et al.

(10) Patent No.: US 11,289,071 B2
(45) Date of Patent: Mar. 29, 2022

(54) INFORMATION PROCESSING SYSTEM, INFORMATION PROCESSING DEVICE, COMPUTER PROGRAM, AND METHOD FOR UPDATING DICTIONARY DATABASE

(71) Applicant: Murata Manufacturing Co., Ltd., Kyoto-fu (JP)

(72) Inventors: Yorinobu Maeda, Nagaokakyo (JP); Yoshinari Ishibashi, Nagaokakyo (JP); Masaharu Itaya, Nagaokakyo (JP); Daisuke Hongou, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 240 days.

(21) Appl. No.: 16/661,742

(22) Filed: Oct. 23, 2019

(65) Prior Publication Data
US 2020/0058292 A1 Feb. 20, 2020

Related U.S. Application Data

(63) Continuation of application No. PCT/JP2018/012432, filed on Mar. 27, 2018.

(30) Foreign Application Priority Data

May 11, 2017 (JP) .............................. JP2017-094907

(51) Int. Cl.
*G06F 16/23* (2019.01)
*G06F 16/25* (2019.01)
(Continued)

(52) U.S. Cl.
CPC ........ *G10L 15/063* (2013.01); *G06F 16/2379* (2019.01); *G06F 16/252* (2019.01);
(Continued)

(58) Field of Classification Search
CPC .. G06F 16/252; G06F 16/2379; G06F 40/242; G06N 5/04; G10L 2015/0635
See application file for complete search history.

(56) References Cited

U.S. PATENT DOCUMENTS 8,185,380 B2 * 5/2012 Kameyama .......... G08G 1/0962
704/10
8,543,399 B2 * 9/2013 Jeong ...................... G10L 15/08
704/240
(Continued)

*Primary Examiner* — Daniel C Washburn
*Assistant Examiner* — Oluwadamilola M Ogunbiyi
(74) *Attorney, Agent, or Firm* — Studebaker & Brackett PC

(57) ABSTRACT

An information processing device stores, in a keyword database, keywords extracted from speech sounds picked up by a speech-sound processing device as keywords matching keyword entries in a dictionary database of the speech-sound processing device. The information processing device receives, from the speech-sound processing device, an instruction to update the dictionary database of the speech-sound processing device, and then determines, by inference, words related to the keywords stored in the keyword database, prepares an update of the dictionary database on the basis of the keywords stored in the keyword database and the related words determined by inference, and transmits the update of the dictionary database to the speech-sound processing device.

8 Claims, 3 Drawing Sheets

(51) Int. Cl.
*G06F 40/242* (2020.01)
*G06N 5/04* (2006.01)
*G06Q 50/00* (2012.01)
*G10L 15/06* (2013.01)
*G10L 15/08* (2006.01)
*G10L 15/22* (2006.01)

(52) U.S. Cl.
CPC .............. *G06F 40/242* (2020.01); *G06N 5/04* (2013.01); *G10L 15/08* (2013.01); *G10L 15/22* (2013.01); *G06Q 50/01* (2013.01); *G10L 2015/0635* (2013.01); *G10L 2015/088* (2013.01)

(56) References Cited

U.S. PATENT DOCUMENTS

| | | | | |
|---|---|---|---|---|
| 2004/0249790 A1* | 12/2004 | Komamura | | G06F 16/3322 |
| 2008/0243833 A1* | 10/2008 | Wang | | G06F 16/36 |
| 2009/0055185 A1* | 2/2009 | Nakade | | G10L 15/30 |
| | | | | 704/257 |
| 2009/0292528 A1* | 11/2009 | Kameyama | | G10L 13/00 |
| | | | | 704/9 |
| 2010/0036918 A1* | 2/2010 | Gupta | | H04L 51/12 |
| | | | | 709/206 |
| 2010/0293169 A1* | 11/2010 | Takata | | G06F 16/951 |
| | | | | 707/749 |
| 2010/0306249 A1* | 12/2010 | Hill | | G06Q 50/01 |
| | | | | 707/769 |
| 2012/0123855 A1* | 5/2012 | Gu | | G06Q 30/0247 |
| | | | | 705/14.46 |
| 2013/0007069 A1* | 1/2013 | Chaliparambil | | G06Q 10/10 |
| | | | | 707/803 |
| 2013/0086046 A1* | 4/2013 | Lundberg | | G06F 40/237 |
| | | | | 707/722 |
| 2014/0088967 A1* | 3/2014 | Kawamura | | G10L 15/30 |
| | | | | 704/251 |
| 2014/0280170 A1* | 9/2014 | Tanaka | | G09B 7/02 |
| | | | | 707/739 |
| 2015/0066952 A1* | 3/2015 | Tavakkol | | G06Q 30/0631 |
| | | | | 707/748 |
| 2016/0071516 A1* | 3/2016 | Lee | | G10L 15/18 |
| | | | | 704/251 |
| 2016/0170981 A1* | 6/2016 | Morimoto | | G06F 3/0481 |
| | | | | 707/769 |
| 2016/0188702 A1* | 6/2016 | Lee-Goldman | | G06F 16/3322 |
| | | | | 707/749 |
| 2016/0292803 A1* | 10/2016 | Morimoto | | G06F 16/285 |
| 2017/0011479 A1* | 1/2017 | Morimoto | | G06Q 50/18 |
| 2017/0091289 A1* | 3/2017 | Ohazulike | | G06Q 10/20 |
| 2017/0147652 A1* | 5/2017 | Kuo | | G06F 16/21 |
| 2018/0218079 A1* | 8/2018 | Li | | G06F 40/289 |
| 2018/0365324 A1* | 12/2018 | Finberg | | G06N 20/00 |
| 2019/0244119 A1* | 8/2019 | Farri | | G06N 3/08 |
| 2020/0335098 A1* | 10/2020 | Saito | | G06F 16/2379 |

* cited by examiner

INFORMATION PROCESSING SYSTEM, INFORMATION PROCESSING DEVICE, COMPUTER PROGRAM, AND METHOD FOR UPDATING DICTIONARY DATABASE

CROSS-REFERENCE TO RELATED APPLICATIONS

This application claims benefit of priority to International Patent Application No. PCT/JP2018/012432, filed Mar. 27, 2018, and to Japanese Patent Application No. 2017-094907, filed May 11, 2017, the entire contents of each are incorporated herein by reference.

BACKGROUND

Technical Field

The present disclosure relates to an information processing system, an information processing device, a computer program, and a method for updating a dictionary database.

Background Art

With the proliferation of social networking services (SNSs) and review websites, an increasing number of customers peruse other people's messages and reviews about particular facilities and stores. For example, positive messages about a facility that are posted on an SNS or good reviews about a store that are posted on a review website can become an incentive for customers to visit the facility or to shop at the store. Such an SNS or review website can be a tool for the practice known as stealth marketing. Stealth marketing is a practice by which a person pretending to be an ordinary customer posts a comment or an article to advertise a product or a service to general customers without letting them realize that the product or the service is marketed to them and to intentionally make the product or the service popular accordingly. Analyzing only online reviews posted on SNSs and review websites is therefore not useful enough for a person having difficulty in determining whether a product or a service having good reviews on the Internet is popular on the Internet only or is enjoying popularity in the real world too. As disclosed in International Publication No. WO2008/072413A1 and Japanese Unexamined Patent Application Publication No. 2016-90891, meanwhile, speech recognition techniques are known which enable conversion of speech-sound information to text so that the speech-sound information is recognized as character information.

SUMMARY

Extracting, by using the speech recognition techniques disclosed in International Publication No. WO2008/072413A1 and Japanese Unexamined Patent Application Publication No. 2016-90891, keywords from speech sounds produced by customers and determining whether a product or a service is actually enjoying popularity require that a dictionary database including keyword entries be optimized to ensure appropriate determination.

Therefore, the present disclosure optimizes a dictionary database so that whether a product or a service is actually enjoying popularity will be appropriately determined.

An information processing system according to the present disclosure includes a speech-sound processing device and an information processing device. The speech-sound processing device includes a speech-sound pickup means that picks up speech sounds; a dictionary database including keyword entries; an extraction means that extracts, from the speech sounds picked up by the speech-sound pickup means, keywords matching keyword entries in the dictionary database; an instruction means that prepares an update instruction for updating the dictionary database; and a first communication means that transmits, to the information processing device, the keywords extracted by the extraction means and the update instruction prepared by the instruction means. The information processing device includes: a second communication means that receives the keywords and the update instruction transmitted by the first communication means; a keyword database that stores the keywords received by the second communication means; an inference means that determines, by inference, words related to the keywords stored in the keyword database in accordance with the update instruction received by the second communication means; and a dictionary-database preparation means that prepares an update of the dictionary database on the basis of the keywords stored in the keyword database and the related words determined by inference. The second communication means transmits the update of the dictionary database to the speech-sound processing device.

The information processing system according to the present disclosure enables optimization of the dictionary database so that whether a product or a service is actually enjoying popularity will be appropriately determined.

DETAILED DESCRIPTION

Embodiments of the present disclosure will be described below with reference to the drawings. Note that the same reference signs refer to the same constituent components, and redundant description thereof will be omitted.

Figure 1:
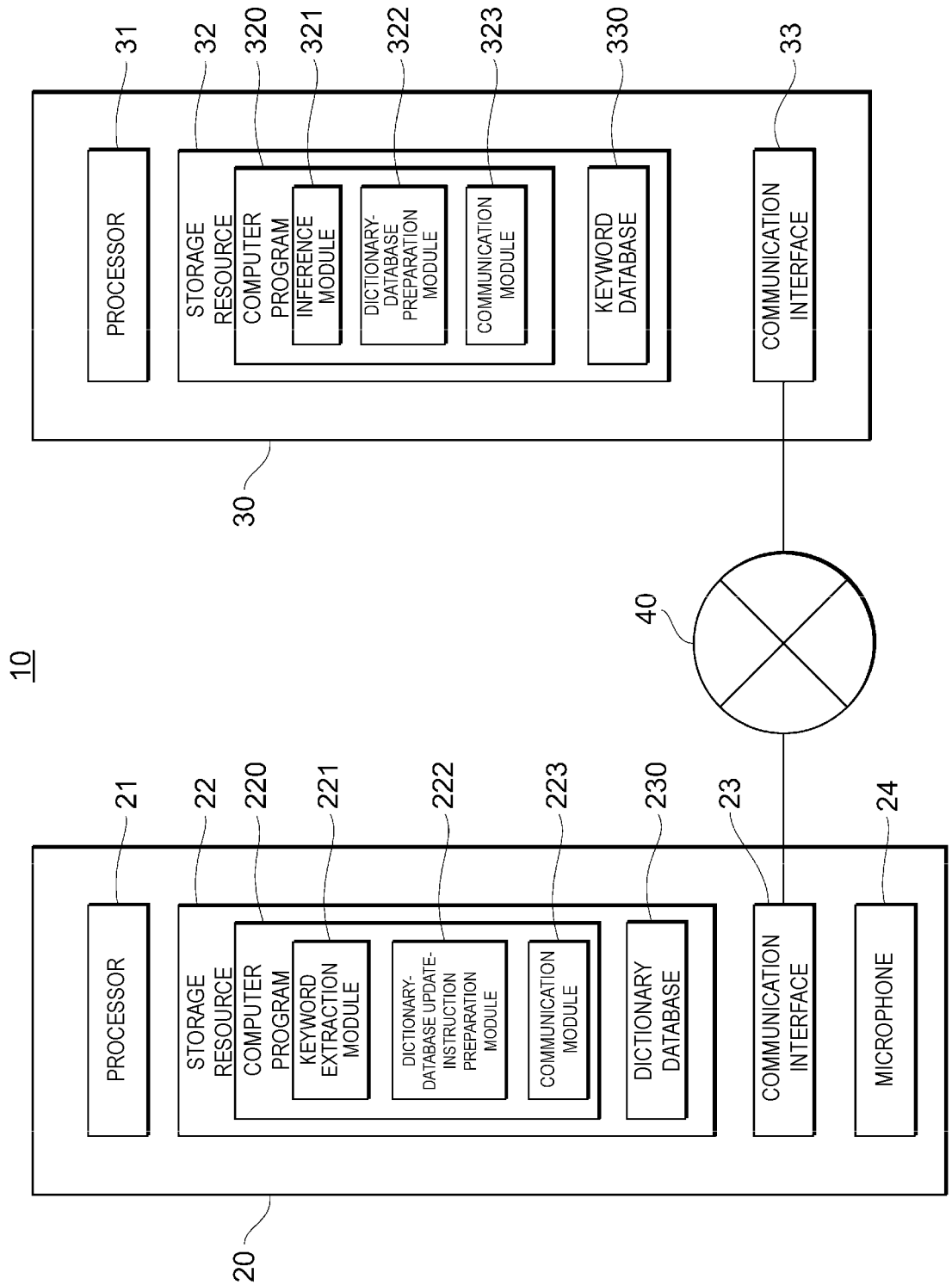
FIG. 1 is a configuration diagram of an information system according to an embodiment of the present disclosure.

FIG. 1 is a configuration diagram of an information processing system 10 according to an embodiment of the present disclosure. The information processing system 10 is a computer system for determining, by using speech recognition, whether a product or a service is actually enjoying popularity. The information processing system 10 includes a speech-sound processing device 20 and an information processing device 30. The speech-sound processing device 20 and the information processing device 30 are communicably connected to each other through a communication network 40.

The speech-sound processing device 20 is a computer for picking up speech sounds produced by customers and executing the processing for extracting keywords from the picked-up speech sounds. The term "keyword" refers to a word that serves as an index for determining, by using speech recognition, whether a product or a service is actually enjoying popularity. When keywords such as "handle", "brake", and "tire" are extracted from speech sounds produced by customers, "car" is conceivably a topic of conversation. The speech-sound processing device 20 may be a computer located in a facility or a store available for use by customers or may be a computer (such as a multi-function mobile phone known as a smart phone or a tablet terminal) owned by a customer who uses the facility or shops at the store.

The speech-sound processing device 20 includes, as the hardware resources thereof, a processor 21, a storage resource 22, a communication interface 23, and a microphone 24. The microphone 24 may be an internal microphone of the speech-sound processing device 20 or may be an external microphone (an external, wired or wireless microphone). For example, a tablet terminal equipped with an external microphone connected thereto functions as the speech-sound processing device 20.

The processor 21 is a central processing unit (CPU) including an arithmetic and logic unit that performs, for example, arithmetic operations, logic operations, and bit operations and various registers (such as data registers, an instruction register, and general-purpose registers). The processor 21 interprets and executes a computer program 220 stored in the storage resource 22 to control the operation of the speech-sound processing device 20 (such as speech-sound pickup processing, keyword extraction processing, and communication processing).

The storage resource 22 is a logical device provided by the storage area of a physical device and functions as a storage means. The physical device may be, for example, a computer-readable recording medium such as a hard disk drive, a solid-state drive, a memory card, an optical disk drive, or a semiconductor memory. The semiconductor memory may be a volatile memory or a nonvolatile memory. The storage resource 22 stores the computer program 220 and a dictionary database 230. The dictionary database 230 includes keyword entries.

The communication interface 23 controls, through the communication network 40, the communication between the speech-sound processing device 20 and the information processing device 30. The communication network 40 is, for example, a network including both wired networks (e.g., short-distance communication networks, wide area networks, and value-added networks) and wireless networks (e.g., mobile communication networks, satellite communication networks, Bluetooth, wireless fidelity (WiFi), and high speed downlink packet access (HSDPA)). The speech-sound processing device 20 and the information processing device 30 may be linked to each other via a gateway server that converts between their respective communications protocols.

The microphone 24 is, for example, a pickup microphone including a parabolic sound pickup board and functions as a speech-sound pickup means that picks up speech sounds. The microphone 24 picks up speech sounds produced by customers using a facility or shopping at a store, performs A/D conversion on the picked-up speech sounds, and temporarily stores the resultant speech sounds in part of a storage area (a buffer memory) of the storage resource 22.

The computer program 220 is a program for controlling the operation of the speech-sound processing device 20 and includes a plurality of software modules invoked and executed within a main program. Each software module is a sub-program modularized to execute specific processing (such as keyword extraction processing, dictionary-database update-instruction preparation processing, or communication processing). Each software module is formulated by using, for example, procedures, subroutines, methods, functions, or data structures. The computer program 220 includes, as modularized sub-programs, a keyword extraction module 221, a dictionary-database update-instruction preparation module 222, and a communication module 223.

The keyword extraction module 221 is a sub-program defining the processing for extracting, from speech sounds picked up by the microphone 24, keywords matching keyword entries in the dictionary database 230. The keyword extraction module 221 extracts keywords from speech sounds by converting information on speech sounds picked up by the microphone 24 to text, recognizing the text as character-string information, and comparing the character-string information with the keyword entries. In the processing for converting the information on speech sounds to text, speech segments are acquired from the information on speech sounds picked up by the microphone 24, and the acquired speech segments are then subjected to pattern matching based on a statistical language model. The statistical language model is a probability model for calculating, for example, the probability of occurrence of verbal expressions, such as the occurrence distribution of words and the distribution of words immediately following a certain word. The hardware resources of the speech-sound processing device 20 and the keyword extraction module 221 cooperate to serve as an extraction means that extracts, from the speech sounds picked up by the microphone 24, keywords matching keyword entries in the dictionary database 230.

The dictionary-database update-instruction preparation module 222 is a sub-program defining the processing for preparing an instruction for updating the dictionary database 230 (a dictionary-database update instruction). The dictionary-database update instruction is prepared at predetermined moments. The predetermined moments may be moments at which the match rate of the dictionary database 230 falls below a predetermined threshold value or may be predetermined intervals. The match rate refers to the proportion of keywords that are determined to be included in speech sounds produced by customers out of the total number of keyword entries in the dictionary database 230. The hardware resource of the speech-sound processing device 20 and the dictionary-database update-instruction preparation module 222 cooperate to serve as an instruction means that prepares a dictionary-database update instruction.

The communication module 223 is a sub-program defining communication processing based on communications protocols of the speech-sound processing device 20 and the information processing device 30. The hardware resource of the speech-sound processing device 20 and the communication module 223 cooperate to serve as a communication means. The keywords extracted by the keyword extraction module 221 are transmitted to the information processing device 30 through the communication interface 23. Similarly, the dictionary-database update instruction prepared by the dictionary-database update-instruction preparation module 222 is transmitted to the information processing device 30 through the communication interface 23.

The information processing device 30 is a computer that receives and retains the keywords transmitted by the speech-sound processing device 20 to determine a topic of conversation by inference. The topic determined by inference is provided to, for example, an advertising agency. The information processing device 30 also executes processing for updating the dictionary database 230 to optimize the dictionary database 230.

The information processing device 30 includes, as the hardware resource thereof, a processor 31, a storage resource 32, and a communication interface 33. The hardware configurations of the processor 31, the storage resource 32, and the communication interface 33 are similar to corresponding hardware configurations of the processor 21, the storage resource 22, and the communication interface 23 and will not be further elaborated here.

The communication interface 33 receives the keywords and the dictionary-database update instruction transmitted by the speech-sound processing device 20. The storage resource 32 stores a computer program 320 and a keyword database 330. The keyword database 330 stores the keywords received by the communication interface 33.

The computer program 320 is a program for controlling the operation of the information processing device 30 and includes a plurality of software modules invoked and executed within a main program. Each software module is a sub-program modularized to execute specific processing (such as related-word inference processing, dictionary-database updating, or communication processing). The computer program 320 includes, as such software modules, an inference module 321, a dictionary-database preparation module 322, and a communication module 323.

The inference module 321 is a sub-program for determining, by inference, words related to the keywords stored in the keyword database 330 in accordance with the dictionary-database update instruction received by the communication interface 33. Keyword-related words are words frequently used with keywords and are also referred to as "co-occurrence words". Co-occurrence words are not necessarily synonyms. The inference module 321 is, for example, a co-occurrence word search tool to which artificial intelligence is applied. A known co-occurrence word search tool performs a morphological analysis on contents of a website coming up high in the search results provided by, for example, Google or Yahoo and presents, as co-occurrence words, words of frequent occurrence throughout the piece of writing. Morphological analysis refers to a practice of segmenting text data of a natural language having no grammatical information in the form of annotations into strings of morphemes (the smallest unit of meaning in a language) on the basis of, for example, the grammar of the language of interest or information on parts of speech, referred to as a dictionary, and identifying the part of speech of each morpheme. The hardware resource of the information processing device 30 and the inference module 321 cooperate to serve as an inference means that determines, by inference, keyword-related words.

The dictionary-database preparation module 322 is a sub-program for updating the dictionary database 230 in accordance with the dictionary-database update instruction received by the communication interface 33. The dictionary-database preparation module 322 prepares an update of the dictionary database 230 on the basis of the keywords stored in the keyword database 330 and the related words that the inference module 321 has determined by inference. The update of the dictionary database 230 includes, as keyword entries, keywords having been extracted from speech sounds produced by customers and words related to the keywords. Of the keyword entries in the pre-update dictionary database 230, keywords that have not been extracted from speech sounds produced by customers are deleted from the update of the dictionary database 230. Repeating the updating will enable the dictionary database 230 to yield a higher match rate. The hardware resource of the information processing device 30 and the dictionary-database preparation module 322 cooperate to serve as a dictionary-database preparation means that prepares an update of the dictionary database 230.

The communication module 323 is a sub-program defining communication processing based on communications protocols of the information processing device 30 and the speech-sound processing device 20. The hardware resource of the information processing device 30 and the communication module 323 cooperate to serve as a communication means. The communication interface 33 transmits the update of the dictionary database 230 to the speech-sound processing device 20. Upon receipt of the update of the dictionary database 230, the speech-sound processing device 20 replaces the pre-update dictionary database 230 with the update of the dictionary database 230.

To be distinguishable from each other, the communication means of the speech-sound processing device 20 and the communication means of the information processing device 30 are herein also referred to as a first communication means and a second communication means, respectively.

In FIG. 1, a single speech-sound processing device 20 is connected to a single information processing device 30 for convenience of illustration. Alternatively, a plurality of speech-sound processing devices 20 may be connected to a plurality of information processing devices 30. Still alternatively, a plurality of speech-sound processing devices 20 may be connected to a single information processing device 30, or a single speech-sound processing device 20 may be connected to a plurality of information processing devices 30.

Figure 2:
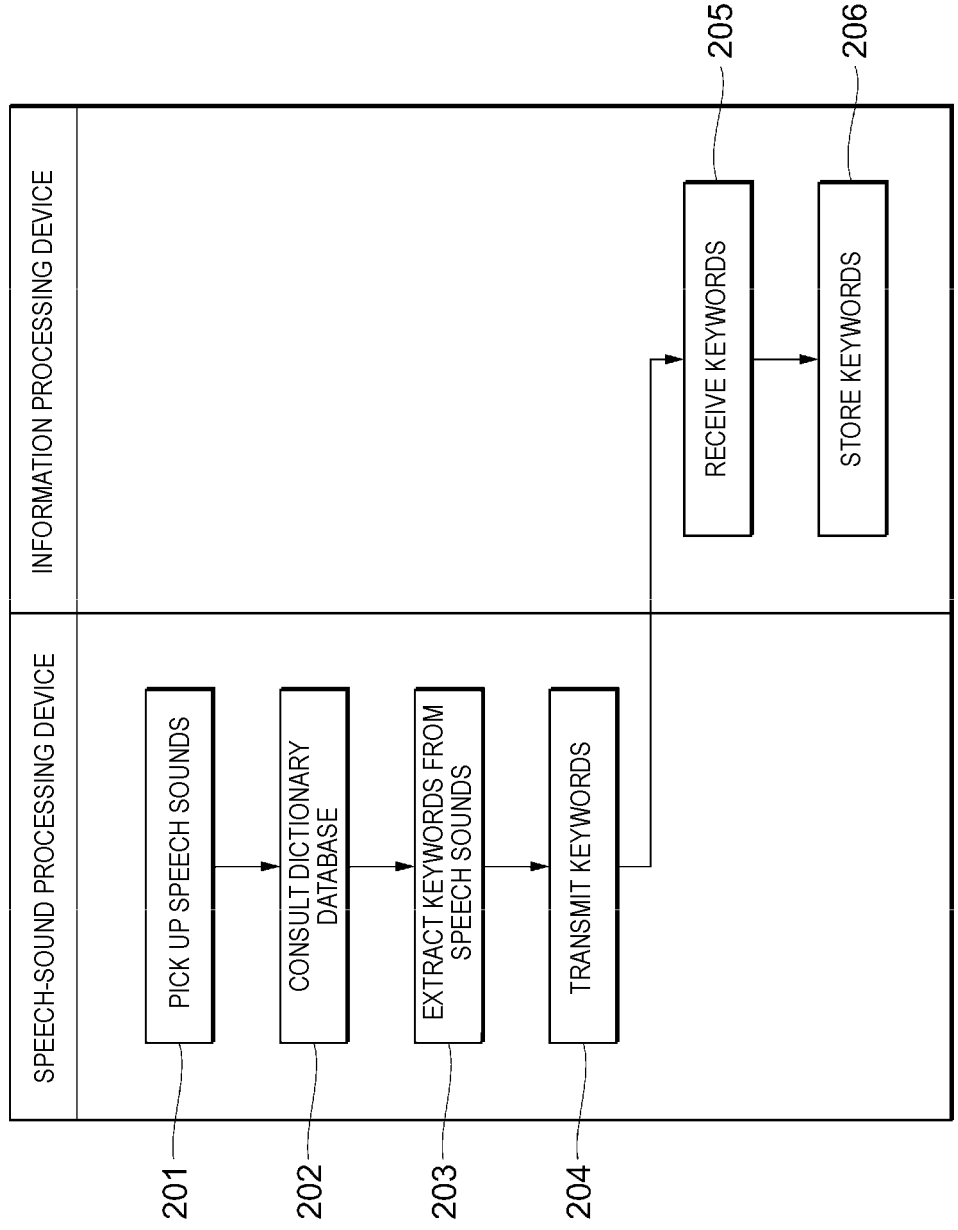
FIG. 2 is a flowchart of keyword extraction processing according to an embodiment of the present disclosure.

Referring to FIG. 2, the following describes the procedure for extracting keywords.

The speech-sound processing device 20 picks up, through the microphone 24, speech sounds produced by customers (Step 201). While the speech-sound processing device 20 is operating, the microphone 24 may keep picking up speech sounds or may pick up speech sounds intermittently or at regular intervals. Then, the speech-sound processing device 20 consults the dictionary database 230 (Step 202) and extracts keywords from speech sounds (Step 203). While the speech-sound processing device 20 is operating, the speech-sound processing device 20 may keep extracting keywords from speech sounds. The speech-sound processing device 20 then transmits the extracted keywords to the information processing device 30 (Step 204). While the speech-sound processing device 20 is operating, the speech-sound processing device 20 may keep transmitting keywords to the information processing device 30 or may transmit keywords to the information processing device 30 intermittently or at regular intervals. When no keywords are extracted from speech sounds picked up by the microphone 24, keyword transmission to the information processing device 30 is not performed. The information processing device 30 receives the keywords transmitted by the speech-sound processing device 20 (Step 205) and stores the received keywords in the keyword database 330 (Step 206).

Figure 3:
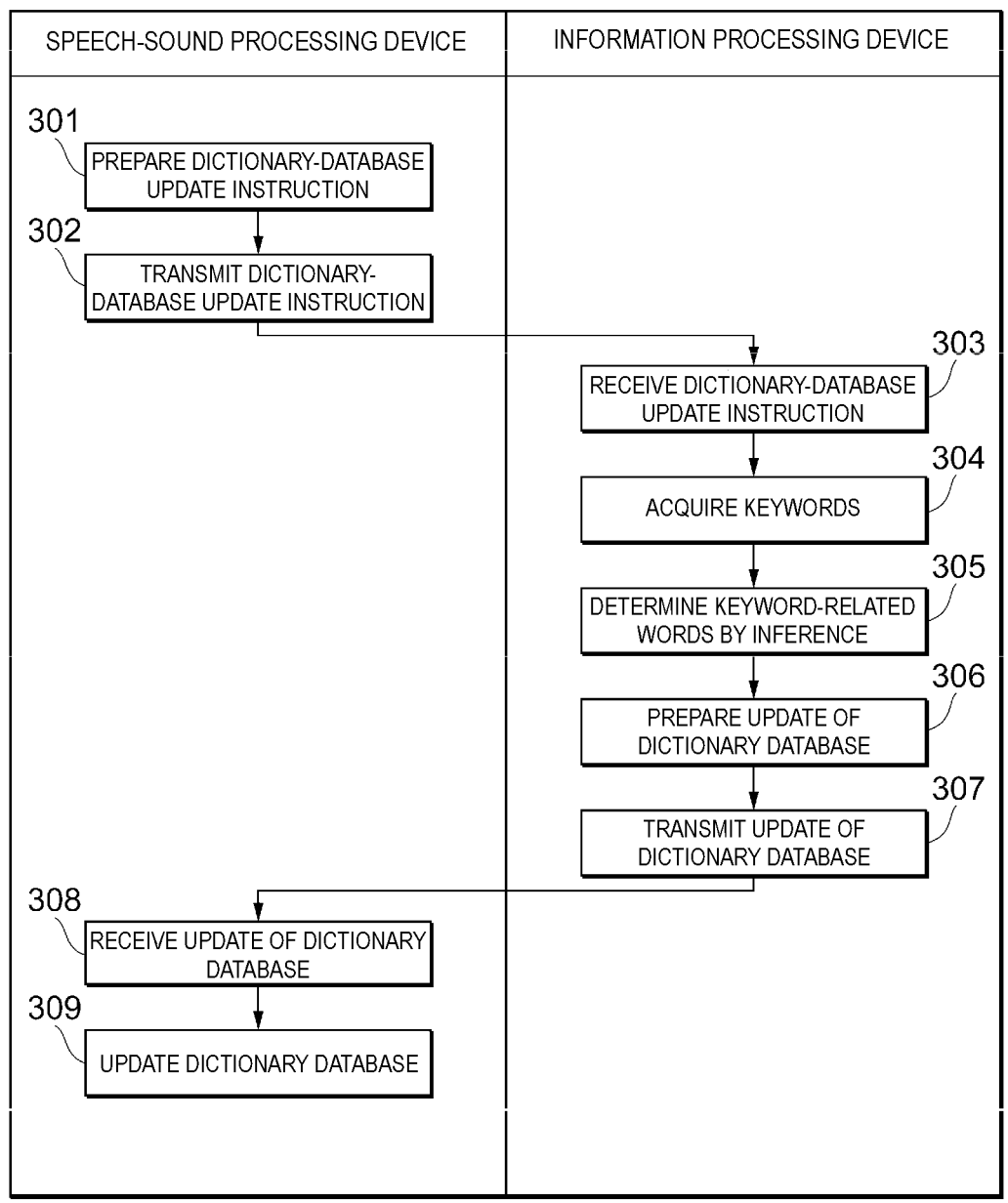
FIG. 3 is a flowchart of dictionary-database updating according to an embodiment of the present disclosure.

Referring to FIG. 3, the following describes the procedure for updating the dictionary database.

The speech-sound processing device 20 prepares a dictionary-database update instruction at predetermined moments (Step 301) and transmits the instruction to the information processing device 30 (Step 302). Upon receipt of the dictionary-database update instruction (Step 303), the information processing device 30 acquires keywords from the keyword database 330 (Step 304) and determines, by inference, keyword-related words (Step 305). Then, the information processing device 30 prepares, on the basis of the keywords and the keyword-related words, an update of the dictionary database 230 (Step 306) and transmits the update to the speech-sound processing device 20 (Step 307). Upon receipt of the update of the dictionary database 230 (Step 308), the speech-sound processing device 20 updates the dictionary database 230 by replacing the pre-update dictionary database 230 with the update of the dictionary database 230 (Step 309).

As described above, updating the dictionary database 230 on the basis of the keywords extracted from speech sounds picked up by the speech-sound processing device 20 as keywords matching keyword entries in the dictionary database 230 of the speech-sound processing device 20 and on the basis of words related to the extracted keywords will enable the dictionary database 230 to yield a higher match rate. The dictionary database 230 is thus optimized so that whether a product or a service is actually enjoying popularity will be appropriately determined. The speech sounds picked up by the microphone 24 are real speech sounds produced by customers, and whether a product or a service is actually enjoying popularity is accordingly determined on the basis of real-world evaluations without reliance on online reviews. Since unwanted keywords are deleted from the dictionary database 230 through continual updating of the dictionary database 230, a small storage capacity available in the dictionary database 230 will suffice. This enables the speech-sound processing device 20 to have a reduced size and power consumption.

The embodiments above have been described to facilitate the understanding of the present disclosure and should not be construed as limiting the scope of the present disclosure. The present disclosure may be altered and/or modified without departing from the spirit of the present disclosure and embraces equivalence of such alterations and modifications. That is, the embodiments with design changes made as appropriate by those skilled in the art fall within the scope of the present disclosure as long as the features of the present disclosure are involved. Varying combinations of the components of the embodiments may be devised as long as they are technically possible, and these combinations also fall within the scope of the present disclosure as long as the features of the present disclosure are involved.

The invention claimed is:

1. An information processing system comprising:
a speech-sound processor; and
an information processor,
wherein
the speech-sound processor is configured to:
control a speech-sound pickup to pick up speech sounds;
manage a dictionary database including keyword entries;
extract, from the speech sounds picked up, keywords matching the keyword entries in the dictionary database;
prepare an update instruction for updating the dictionary database; and
control transmission of the keywords extracted and the update instruction to the information processor,
the information processor is configured to:
receive the keywords and the update instruction transmitted under the control of the speech-sound processor;
manage a keyword database configured to store the keywords received;
determine, by inference, words related to the keywords stored in the keyword database in accordance with the update instruction received;
prepare an update of the dictionary database on the basis of the keywords stored in the keyword database and the related words determined by inference; and
control transmission of the update of the dictionary database to the speech-sound processor.

2. The information processing system according to claim 1, wherein
the speech-sound processor is configured to control the speech-sound pickup to pick up speech sounds at intervals.

3. The information processing system according to claim 1, wherein
the speech-sound processor is configured to control the transmission of the keywords extracted to the information processor at intervals.

4. The information processing system according to claim 1, wherein
the speech-sound processor is configured to prepare the update instruction at predetermined intervals.

5. The information processing system according to claim 1, wherein
the speech-sound processor is configured to prepare the update instruction at moments at which a match rate of the dictionary database falls below a predetermined threshold value, the match rate representing a proportion of keywords in the speech sounds picked up out of a total number of the keyword entries in the dictionary database.

6. An information processor comprising:
a communication interface configured to receive, from a speech-sound processor, keywords extracted from speech sounds picked up by the speech-sound processor as keywords matching keyword entries in a dictionary database of the speech-sound processor and an update instruction for updating the dictionary database;
a keyword database configured to store the keywords received by the communication interface; and
a processor configured to determine, by inference, words related to the keywords stored in the keyword database in accordance with the update instruction received by the communication interface, and prepare an update of the dictionary database on the basis of the keywords stored in the keyword database and the related words determined by inference,
wherein the communication interface is further configured to transmit the update of the dictionary database to the speech-sound processor.

7. A non-transitory computer-readable medium encoded with a computer program that causes a computer to execute:
receiving, from a speech-sound processor, keywords extracted from speech sounds picked up by the speech-sound processor as keywords matching keyword entries in a dictionary database of the speech-sound processor and an update instruction for updating the dictionary database;
storing the received keywords in a keyword database;
determining, by inference, words related to the keywords stored in the keyword database in accordance with the received update instruction;
preparing an update of the dictionary database on the basis of the keywords stored in the keyword database and the related words determined by inference; and
transmitting the update of the dictionary database to the speech-sound processor.

8. A method for updating a dictionary database, the method comprising controlling a computer to execute:
receiving, from a speech-sound processor, keywords extracted from speech sounds picked up by the speech-sound processor as keywords matching keyword entries in a dictionary database of the speech-sound processor and an update instruction for updating the dictionary database;

storing the received keywords in a keyword database;

determining, by inference, words related to the keywords stored in the keyword database in accordance with the received update instruction;

preparing an update of the dictionary database on the basis of the keywords stored in the keyword database and the related words determined by inference; and transmitting the update of the dictionary database to the speech-sound processor.

\* \* \* \* \*